Patented Mar. 11, 1924.

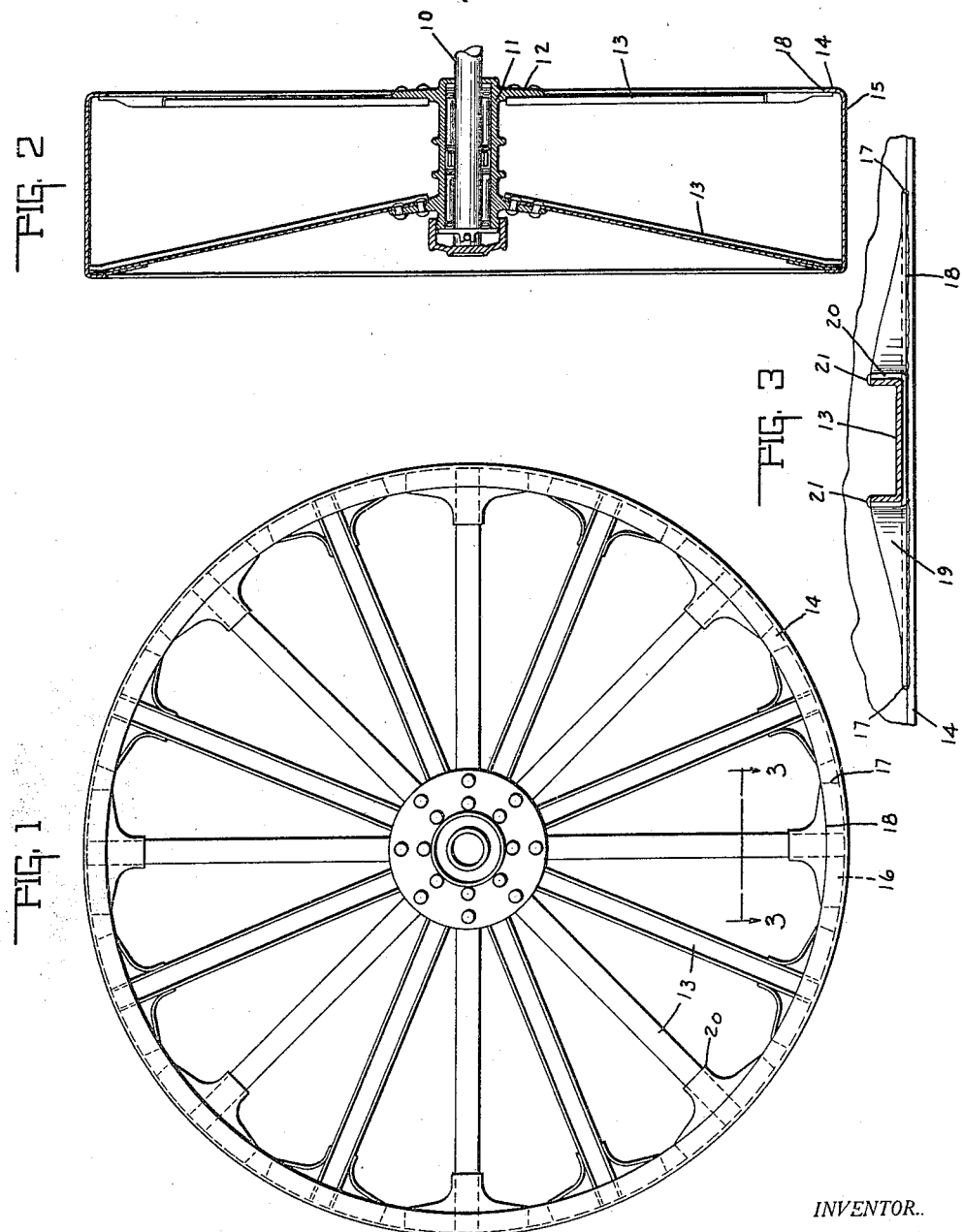

1,486,405

UNITED STATES PATENT OFFICE.

PAUL H. WHITE, OF INDIANAPOLIS, INDIANA, ASSIGNOR TO INDIANA SILO AND TRACTOR CO., OF ANDERSON, INDIANA, A CORPORATION.

TRACTOR-WHEEL CONSTRUCTION.

Application filed October 24, 1921. Serial No. 509,989.

*To all whom it may concern:*

Be it known that I, PAUL H. WHITE, a citizen of the United States, and a resident of Indianapolis, county of Marion, and State of Indiana, have invented a certain new and useful Tractor-Wheel Construction; and I do hereby declare that the following is a full, clear, and exact description thereof, reference being had to the accompanying drawings, in which like numerals refer to like parts.

This invention relates to a vehicle wheel such as is used upon tractors and other vehicles wherein a light weight but very strong wheel is required.

The chief object of the invention is to construct a wheel with a rim and support said rim in spaced relation with the hub portion of the wheel by spokes and secure said spokes to said rim, reenforcing the rim and the spokes.

The chief feature of the invention consists in the means for reenforcing the spokes and the rim and securing said spokes to said rim.

The full nature of the invention will be understood from the accompanying drawings and the following description and claims.

In the drawings, Fig. 1 is a side elevational view of a wheel embodying the features of the invention. Fig. 2 is a central sectional view of the same. Fig. 3 is an enlarged sectional view taken on the line 3—3 of Fig. 1 and in the direction of the arrows.

In the drawings 10 indicates a supporting axle on which is supported a hub construction 11 having a pair of spoke supporting flange portions 12. Each of the flange portions supports a row of spokes 13, which spokes as shown in Fig. 3 are channel-shaped in cross section.

The spokes, as shown clearly in Figs. 1 and 2 extend radially from the hub construction and are secured at their inner ends to the two flange portions, one of which is substantially perpendicular to the hub and the other of which is inclined at an angle thereto, thereby positioning the end of the hub within the wheel. The spokes 13 are secured such that the flat face of the channel is positioned outwardly, thereby presenting a flat face to the side portion 14 of the channel shaped wheel rim 15.

The spokes 13 extend to the rim portion 15 of the wheel and thereby are made to reenforce the same. As shown clearly in the figures, the channel shaped spoke 13 is secured to the wheel by means of a gusset plate which comprises a base portion 16, shown dotted in Fig. 1 and said base portion consists of an arcuate flat plate which extends parallel to the side portion 14 of the rim 15 and is secured to said side at the ends of said base portion 16, as indicated by the numeral 17 and is also secured to the side 14 of the rim 15 along the edge 18 thereof. In this manner the side portion of the rim is not weakened by drilling holes through the same. It will be noted that the side portion 14 is reenforced by the addition of another thickness of metal and the relatively great circumferential width of the base portion of the gusset plate construction reenforces the rim and prevents distortion such as flattening or collapsing thereof.

The gusset plate has its edges turned on part of its periphery to an angle of 90 degrees thereby forming a channel of varying cross sections, the legs of which constantly increase in length and the face of which constantly decreases in width from the arcuate side to the channel-shaped spoke engaging portion. This construction results in reenforcing and strengthening the gusset plate against lateral flexure and advantage is also taken of this arrangement to form a channel seat 20 in which to position the spoke 13.

The outer face of the channel spoke and the channel-shaped portion 20 are suitably secured together by having their flanged edges welded at 21 and, therefore, the spoke construction is reenforced as well as secured in the rim.

It will also be noted that the summation of the arcuate gusset plates around the periphery of the wheel establishes substantially an inner reenforcing periphery.

The invention claimed is:

1. In a wheel, the combination with a hub, and a channel-shaped rim, of a plurality of spokes each secured at one end to the hub and terminating within the channel of the rim, and a gusset plate embracing each spoke and securing the same to the channel rim side.

2. In a wheel, the combination with a hub, and a relatively wide rim, of a plurality of channel-shaped spokes secured at one end to the hub and terminating adjacent the rim, and a complementary-shaped gusset plate embracing each spoke and securing the same to the rim.

3. A device of the character described in claim 2 characterized by the positioning of the alternate spokes at opposite sides of the rim.

4. In a wheel construction, the combination with a hub, and a channel-shaped rim, of a channel-shaped spoke secured to the hub and terminating within the rim channel, and a spoke securing gusset plate comprising a base portion adapted to be secured to the rim channel side, a complementary channel-shaped spoke embracing portion adapted to be secured to the spoke, and an intermediate channel-shaped portion between said base portion and said spoke portion.

In witness whereof, I have hereunto affixed my signature.

PAUL H. WHITE.